United States Patent Office 2,866,695
Patented Dec. 30, 1958

2,866,695

GASOLINE FUEL

Lewis F. Gilbert, Detroit, Mich., assignor to Ethyl Corporation, New York, N. Y., a corporation of Delaware No Drawing. Application August 27, 1953
Serial No. 376,979

10 Claims. (Cl. 44—69)

This invention relates to the improvement of organolead material, and in particular to adjuvants for tetraethyllead and tetraethyllead-containing compositions.

Organolead compounds such as tetraphenyllead, tetramethyllead, tetraethyllead, dimethyldiethyllead, and the like have long been known as antiknock agents for fuel for spark ignition type internal combustion engines. Of such materials, however, only tetraethyllead has attained commercial success because of its efficacious attributes. Likewise, it has long been known that the effective utilization of such antiknock agents is enhanced by providing antiknock fluids which consist of organic halogen compounds in admixture with an organolead compound.

Organolead compounds suffer one disadvantage particularly during storage, handling and blending operations, namely their inherent instability. Thus, tetraethyllead and related compounds are susceptible of deterioration which is largely dependent upon the nature of the environment. For example, it has been found that organolead antiknock agents and antiknock fluids containing the same when in contact with certain metals such as copper and copper-containing alloys tend to deteriorate even in a reducing atmosphere. Such deterioration is postulated to result from an adverse catalytic activity exhibited by such metals. In other words, it is generally believed that copper and like metals act as self-perpetuating decomposition accelerators. Another condition enhancing the deterioration of such antiknock agents is contact with air. It is generally believed that atmospheric constituents notably oxygen and ozone, tend to oxidize one or more of the lead-to-carbon bonds with the formation of insoluble decomposition products. Under these conditions there contemporaneously occurs a color change in the dyestuff normally present in antiknock fluids such that the visual identification of the product frequently becomes difficult if not impossible. Organolead antiknock agents are likewise decomposed on exposure to strong light, particularly sunlight. In this case the decomposition is attributed to the catalytic decomposition of the organolead compounds by ultraviolet light. It is apparent, therefore, that the exposure of tetraethyllead and tetraethyllead-containing compositions to any or all of the above environments results in a number of operational difficulties including loss of antiknock effectiveness, the formation of sludge and other types of sediment and the like.

When organolead-containing compositions are utilized in internal combustion engines other difficulties are frequently encountered. For example, in spite of the high degree of efficiency of the normal scavenger complement in antiknock fluids, the accumulation of engine deposits in the engine cannot be entirely prevented. Such deposition is particularly prevalent when spark ignition engines are operated under conditions of low speed and light load such as encountered in metropolitan driving conditions. As a result of notable improvements in fuel antiknock quality which have been made in recent years, such deposits present but a few minor problems in low compression engines. However, because of the trend in the automotive industry of utilizing high compression engines in passenger cars and trucks, the accumulation of deposits results in a number of relatively serious problems including increased detonation, deposit-induced autoignition or wild ping, spark plug fouling, reduction in exhaust valve life, and the like.

Of the problems previously enumerated, those of wild ping, spark plug fouling and reduced exhaust valve life are of considerable concern to the automotive industry. This results from the fact that each time the lead concentration in the fuel is raised to coincide with increases in compression ratio to eliminate detonation the magnitude of one or more of these problems generally increases. As a result, there is a paramount need existing for a new and improved method for altering the physical and chemical characteristics of deposits and for modifying the combustion process such that the well-known detrimental effects of the previously described deposit-induced engine phenomena can be markedly suppressed or be eliminated.

It is, therefore, an object of the present invention to provide adjuvants for organolead compounds. It is likewise an object of this invention to provide means of improving compositions containing organolead antiknock agents such as antiknock fluids and fuels. Similarly, the provision of improved organolead compositions is another object of this invention. A particular object of this invention is to provide improved tetraethyllead and tetraethyllead-containing antiknock fluids. In addition, an object of this invention is to provide methods of improving antiknock fluids such that during compounding, storage and blending operations such materials are stabilized against the adverse effects of deteriorative environments. An additional object of the instant invention is to provide means of obviating deposit-induced engine phenomena of the character described hereinbefore. Other important objects of this invention will be apparent from the discussion hereinafter.

It has now been found that the above and other objects of this invention are attained by providing compositions of matter adapted for use as additives to fuel for spark fired internal combustion engines comprising an organolead antiknock agent and, in quantity sufficient to stabilize or improve said agent, a hydrocarbon substituted phosphine sulfide containing a total of from 3 to about 30 carbon atoms in the molecule. Such phosphorus compounds in which the phosphorus atom is substituted with three hydracarbon radicals can be represented by the general formula

wherein $R_1$, $R_2$, and $R_3$ are hydrocarbon groups as defined hereinafter.

Considering first the hydrocarbon groups of the above described substituted phosphine sulfides designated as $R_1$, $R_2$, and $R_3$, it has been found efficacious to utilize radicals selected from the group consisting of alkyl containing from 1 to about 10 carbon atoms, cycloalkyl containing up to about 8 carbon atoms, and aryl containing from 6 to about 10 carbon atoms. It is apparent, therefore, that the trihydrocarbon substituted phosphine sulfides utilized as organolead adjuvants in accordance with this invention can be substituted with alkyl, cycloalkyl, and aryl radicals. The alkyl substituted embodiments are formed when $R_1$, $R_2$, and $R_3$ in the above general formula are radicals such as methyl, ethyl, n-propyl, isopropyl, and likewise the various straight and branched chain isomers of butyl, amyl, hexyl, heptyl, octyl, and like radicals up to and including about decyl. Similarly, in the embodiments of the adjuvants of this invention wherein $R_1$, $R_2$, and $R_3$ are cycloalkyl groups such groups are exemplified by the cyclohexyl radical which can be further substituted in any of the various positions with a methyl or ethyl radical. Illustrative examples of the aryl-substituted phosphine sulfides are compounds wherein phosphorus is directly bonded to such groups as phenyl, o-methylphenyl, m-methylphenyl, p-methylphenyl, 2,4-dimethylphenyl, 3-propylphenyl, 4-ethylphenyl, 4-butylphenyl, 3,5-diethylphenyl, and the like. In some instances the phenyl radicals substituted in the ortho or para positions are preferred, particularly in the ease of formation of the corresponding phosphorus compound. In contrast, however, it is frequently of advantage to utilize the meta-substituted phenyl radicals because of the tendency of such a group of lowering the melting point of the final compound.

The hydrocarbon groups of the trihydrocarbon-substituted phosphine sulfides utilized in accordance with the present invention can be the same or different hydrocarbon groups of the type described hereinbefore. Although satisfactory results are obtainable utilizing mixed hydrocarbon substituents in the compound, that is, compounds wherein groups designated hereinabove as $R_1$, $R_2$, and $R_3$, are different, it is preferable particularly from the standpoints of ease and economies of preparation to select the compound wherein such radicals are the same at least insofar as the type of radicals is concerned. To illustrate, preferred embodiments of this invention comprise trialkyl-substituted phosphine sulfides, tricycloalkyl phosphine sulfides, and triaryl-substituted phoshine sulfides, wherein the total number of carbon atoms in the molecule is not substantially in excess of about 30. It will be appreciated that such materials are the easiest to prepare and hence are the most readily available adjuvants for use in accordance with this invention. However, it will also be apparent that in the manufacture of such materials it is frequently possible to adjust the conditions and starting materials such that various mixed hydrocarbon substituents can be introduced into the molecule. Of this class of compounds, phosphine sulfides substituted with both alkyl and aryl radicals are preferred as, for example, when $R_1$ and $R_2$ of the preceding general formula are alkyl groups and $R_3$ is an aryl group. Likewise, another preferred class of trihydrocarbon-substituted phosphine sulfides consists of those compounds containing one alkyl and two aryl radicals.

As will be apparent to one skilled in the art the elements sulfur and selenium and in some instances tellurium posses a considerable degree of chemical similarity. Therefore, although the discussion thus far regarding the adjuvants of this invention has not specifically mentioned the corresponding phosphine selenides and phosphine tellurides, such materials can be used to accomplish many of the objectives set forth hereinbefore. However, generally speaking, trihydrocarbon-substituted phosphine selenides and tellurides have certain inherent disadvantages which are not shared by the trihydrocarbon-substituted phosphine sulfides. For example, the selenides and tellurides possess higher melting points, are somewhat more unstable, are more expensive, and in some instances possess nauseating odors and toxic properties which render them less preferred as organolead adjuvants than the trihydrocarbon-substituted phosphine sulfides. Nevertheless, it will be appreciated that both trihydrocarbon-substituted phosphine selenides and trihydrocarbon-substituted phosphine tellurides containing from 3 to about 30 carbon atoms in the molecule, as well as mixtures of these materials in themselves or with the corresponding sulfides are within the purview of the present invention.

Typical trihydrocarbon-substituted phosphine sulfides as above defined are illustrated by such compounds as trimethyl phosphine sulfide, triethyl phosphine sulfide, tripropyl phosphine sulfide, triisopropyl phosphine sulfide, tributyl phosphine sulfide, triphenyl phosphine sulfide, tri-2-ethylhexyl phosphine sulfide, tritolyl phosphine sulfide, dimethylethyl phosphine sulfide, dimethylphenyl phosphine sulfide, diethylphenyl phosphine sulfide, tri-t-butyl phosphine sulfide, trihexyl phosphine sulfide, methyldihexyl phosphine sulfide, propyldiphenyl phosphine sulfide, tricyclohexyl phosphine sulfide, diethylcyclohexyl phosphine sulfide, and the like.

The methods for the preparation of the aforementioned type of phosphorus compounds will be familiar to one skilled in the art. One such method consists of the addition of sulfur to the corresponding trihydrocarbon-substituted phosphine, which reaction is ordinarily carried out in solution on moderate warming. For further details regarding the preparation of such trihydrocarbon-substituted phosphine sulfides and selenides see Kosolapoff, "Organo Phosphorus Compounds." A facet of this invention is the fact that by utilizing certain standard preparative procedures, the phosphine sulfides are obtained in the form of mixtures which are well adapted for use in accordance with this invention. Thus, it is unnecessary to utilize substantially pure materials of the type described hereinbefore provided, however, that a substantial proportion of the mixtures meet the criteria as set forth hereinabove.

The organolead antiknock agent utilized in the compositions of matter of the present invention consists of an organolead compound in which lead is directly bonded to carbon atoms. Such compounds are exemplified by the lead aryls such as tetraphenyllead, and the lead alkyls such as tetramethyllead, tetraethyllead, tetrapropyllead, tetrabutyllead, dimethyldiethyllead, methyltriethyllead, and the like as well as mixtures of such compounds. Because of the generally superior characteristics of tetraethyllead and the ready accessibility thereof as an article of commerce, it constitutes a preferred embodiment of the organolead antiknock agent utilized in accordance with the instant invention.

With the various compositions within the scope of this invention the proportion of the trihydrocarbon-substituted phosphine sulfide containing a total of from 3 to about 30 carbon atoms in the molecule utilized in conjunction with an organolead compound is such that there is a total of from between about 0.05 to about 0.80 theory of phosphorus. In this regard, a theory of phosphorus is defined as the amount of phosphorus theoretically required to react with the lead to form lead ortho phosphate which quantity is two atoms of phosphorus per three atoms of lead. Thus, 0.05 theory of phosphorus corresponds to a phosphorus-to-lead atom ratio of 0.1/3 (since 0.5 theory corresponds to an atom ratio of 1/3) and 0.80 theory corresponds to a phosphorus-to-lead atom ratio of 1.6/3. However, generally speaking, it is sufficient to employ an amount of the previously described phosphine sulfides such that there is an amount of phosphorus between about 0.1 and about 0.5 theory of phosphorus with the best overall results being obtained with amounts of about 0.1 to about 0.3 theory of phosphorus, the last mentioned concentrations constituting a preferred embodiment of this invention.

Regarding many of the problems frequently associated with high octane quality fuel, an anomalous situation obtains. On one hand, an effective adjuvant for organolead compounds should possess stability against deterioration in common environments, compatibility with the chemical entities with which it comes in contact, and volatility so as to possess the characteristic frequently referred to as engine inductibility. On the other hand, the mere selection of a phosphorus compound to acquire the optimum characteristics enumerated above does not necessarily assure the effectiveness of the compound in combatting such phenomena as spark plug fouling, wild ping and the like. It is entirely probable that some empirical relationship between physical properties and effectiveness in the obviation of such problems exists, but as yet the state of the art does not contain a satisfactory relationship of this type. However, the phosphorus materials within the purview of this invention, for the most part, possess the requisite physical properties adapting them for use as organolead adjuvants and at the same time are effective in obviating engine problems of the type described hereinbefore.

It will be apparent that there exists a number of variations in employing the adjuvants of this invention. For example, a facet of this invention involves the provision of a mixture of an organolead antiknock agent such as a lead alkyl and a tri-hydrocarbon-substituted phosphine sulfide containing from 3 to about 30 carbon atoms in the molecule of the type described above. In such a case, the resulting composition can be blended with hydrocarbon fuel of the gasoline boiling range to provide an improved fuel composition which under certain circumstances does not require the utilization of organic halogen-containing material as a scavenger. It is believed that under these conditions the presence of a quantity of phosphorus as above described and chemically bonded in accordance with the requirements of the phosphine sulfides used in this invention contributes sufficient scavenging action such that the amount of deposition in the engine is suitably controlled, notwithstanding the fact that lead phosphates generally have high melting points. Likewise, in this embodiment of the instant invention the general storage characteristics of organolead compounds are frequently enhanced.

Of perhaps more practical importance is a second variant of this invention, namely the utilization of the aforesaid tertiary phosphine sulfides in organolead containing antiknock fluids. It is well known in the art that the most convenient means of marketing and blending organolead antiknock agents is in the form of an antiknock fluid which usually contains, in addition to the lead compound, one or more organic bromine and/or chlorine compounds and an organic dye for identification purposes. On occasion such antiknock fluids likewise contain minor proportions of diluents, antioxidants, metal deactivators and the like. In line with the foregoing, therefore, a preferred embodiment of this invention involves providing improved antiknock fluids containing the requisite concentration of the above described phosphine sulfide. Such improved antiknock fluids generally do not require the presence of a solubilizing agent or a stabilizer since the phosphorus compound itself is generally sufficiently miscible with the constituents of the antiknock fluid and imparts thereto a degree of stabilization. However, under some conditions additional benefits are to be derived by employing in the improved antiknock fluids of this invention the necessary quantities of such materials.

Still another variant of the present invention consists of providing improved fuel compositions. These normally consist of hydrocarbons of the gasoline boiling range containing a minor proportion of the aforesaid antiknock fluids of the present invention. It will be appreciated that the quantity of the antiknock fluids of the present invention utilized in my improved fuel compositions is primarily contingent upon the use for which the gasoline is intended. That is to say, when the fuel is intended for use in automotive engines such as passenger cars, trucks, buses and the like, an amount of any of my improved antiknock fluids equivalent to a lead content in the gasoline of from between about 0.53 and about 3.17 grams of lead per gallon is satisfactory. Thus, in the embodiments of this invention wherein I employ tetraethyllead as an antiknock agent such concentrations are equivalent to from between about 0.5 and about 3 milliliters of the compound per gallon. With the advent of the more recent high compression ratio internal combustion engines, however, it is becoming increasingly apparent that benefits are to be derived by employing somewhat greater concentrations of the organolead material in automotive gasoline. On this basis, therefore, automotive fuels containing up to about 4.75 grams of lead per gallon are contemplated. In contrast, when the improved antiknock fluids of the present invention are utilized in fuel for aviation engines somewhat higher concentrations are employed. Generally speaking, amounts of lead up to about 6.34 grams of lead per gallon can be utilized although somewhat lesser quantities are presently in vogue. In other words, in the tetraethyllead-containing embodiments of this invention there can be present up to about 6 milliliters of tetraethyllead per gallon as an improved antiknock fluid of my invention. Concentrations above these limits can be employed in both motor and aviation fuels, practical considerations being the prime criterion for establishing the upper concentration limit. As indicated hereinabove, in all of the compositions of the present invention the amount of phosphorus is fixed within the limits above described. Thus, in the preferred fuel embodiments of my invention there is present an amount of phosphorus as a tertiary phosphine sulfide wherein the number of carbon atoms in the molecule is from between about 3 to about 30 such that there is from about 0.1 to 0.3 theory of phosphorus. In preparing the improved fuel compositions of this invention it is usually necessary only to add the requisite quantity of the improved fluid to the fuel and by means of stirring, shaking or other means of physical agitation homogeneous fuel compositions are provided. Although the simplest means of preparing such fuels is to blend therewith the necessary quantity of an improved antiknock fluid of this invention, it is possible to add a conventional antiknock fluid to the fuel and subsequently blend therewith the necessary quantity of the t-phosphine sulfide. In addition to reversing this order of addition of conventional antiknock fluids and trihydrocarbon substituted phosphine sulfides another variant within the purview of this invention is to blend with the fuel each of the individual constituents of my antiknock fluids separately.

To illustrate the effectiveness of the improved antiknock fluids of the present invention consideration can be given to the problem of spark plug fouling. In order to do this, recourse can be made to the following general test procedure utilizing a standard modern V-8 engine equipped with overhead valves having a 3¾" bore, a 3 7/16" stroke, a 303.7 cubic inch displacement and a compression ratio of 7.25 to one equipped with commercially available spark plugs. In order to establish a base line this engine is operated in conjunction with an engine dynamometer on a standard commercial fuel containing 3 milliliters of tetraethyllead per gallon as conventional antiknock fluid containing 0.5 theory of bromine as ethylene dibromide and 1.0 theory of chlorine as ethylene dichloride. This is operated under a durability schedule used for spark plug deposit accumulation patterned after road conditions experienced in city driving which are known to produce spark plug fouling of the greatest magnitude. Such operation is substantially continuous until a number of spark plug failures is detected thereby establishing a quantitative measure of the degree of spark plug fouling which can be expressed in average hours to plug failure. The engine is then freed from deposits and equipped with new spark plugs. The same procedure is repeated using the same fuel base stock to which is added an improved anti-knock fluid of the present invention.

By way of example, when 300 gallons of a petroleum hydrocarbon fuel available as an article of commerce is treated with 900 milliliters of tetraethyllead in a fluid containing tetraethyllead, 0.5 theory of bromine as ethylene dibromide and 1.0 theory of chlorine as ethylene dichloride, a suitable fuel is prepared for establishing a base line of hours to spark plug failure. When the standard V–8 engine described hereinbefore is then operated on this homogeneous fuel composition it is found that in an average time of about 34 hours 3 spark plug failures have occurred.

In contrast, when a suitable quantity of the same fuel base stock is treated with an improved antiknock fluid of the present invention greatly enhanced spark plug life is obtained. For example, when 1000 gallons of the same fuel base stock is treated with 3 liters of tetraethyllead as a fluid comprising a 0.5 theory of bromine as ethylene dibromide, 1.0 theory of chlorine as ethylene dichloride, and 0.2 theory of phosphorus as tripropyl phosphine sulfide, an improved fuel of the present invention results. Upon intimately mixing the aforementioned components the homogeneous fuel composition containing 3.0 milliliters of tetraethyllead per gallon is suitable for use in the above described engine test procedure. It is found that a substantial improvement in spark plug performance as evidenced by the greater period of continuous engine operation results from the utilization of such an improved fuel of the present invention. That is to say, the average hours to three spark plug failures is substantially in excess of the base line figure of 34 hours.

Comparable effectiveness is similarly obtained when other improved compositions fo the present invention are utilized for the attainment of the objectives as set forth hereinbefore. When such adjuvants as triethyl phosphine sulfide, tritolyl phosphine sulfide, dimethylethyl phosphine sulfide, triisopropyl phosphine sulfide, and propyldiphenyl phosphine sulfide are utilized in accordance with the present invention comparable effectiveness regarding minimization of spark plug fouling is obtained. In contrast, when certain phosphine sulfides not meeting the characteristics previously set forth are employed a lesser degree of effectiveness obtains. Without desiring to be bound by the following explanation regarding the enhanced effectiveness of the adjuvants of this invention, a tenable explanation apparently involves a proper balance between physical properties such as stability, volatility, solubility, compatibility and the like, and the energy relationships or ease of decomposition which may attribute to the overall effectiveness of the compound by facilitating decomposition at the proper instant in the engine cycle.

To still further illustrate the enhanced effectiveness of the organolead-containing compositions of the present invention, consideration was given to the problem of wild ping. To demonstrate the effectiveness of my compositions in this regard, I subject both a hydrocarbon fuel treated in accordance with this invention and another portion of the same hydrocarbon fuel treated with a conventional antiknock mixture to a test procedure involving the use of a single-cylinder CFR knock test engine equipped with an L-head cylinder and a wild ping counter which records the total number of wild pings which have occurred during the test periods. Such apparatus includes an extra spark plug used as an ionization gap which is installed in a second opening in the combustion chamber. A mechanical breaker switch driven at camshaft speed is also provided which, when closed, makes the wild ping counter ineffective for the duration of the normal flame in the combustion chamber. The breaker is open for 80 crankshaft degrees between 70° B. T. C. (before top dead center) and 10° A. T. C. (after top dead center). If a flame front induced early in the cycle by deposits reaches the ionization gap during this open period, the counter registers a wild ping regardless of the audible manifestations. During normal combustion with ignition timing at T. D. C. (top dead center) the flame front reaches the ionization gap at 15 to 18° A. T. C. during the period wherein the points are closed and no count is made. The actual test procedure consists essentially of operating the test engine initially having a clean combustion chamber under relatively mild cycling conditions for deposit formation until an equilibrium with regard to deposite-induced autoignition is reached. The effect of fuels treated in accordance with the instant invention is determined by comparing the test results obtained using the fuel treated with a tri-hydrocarbon substituted phosphine sulfide with those obtained using a fuel treated with a conventional antiknock mixture. Since the wild ping counter records the total number of wild pings which have occurred during the test procedures a quantitative expression for the amount of deposit-induced autoignition is the number of wild pings per hour of operation. The effectiveness of my improved fuel compositions in virtually eliminating deposit-induced autoignition will be apparent from the following specific examples.

*Example I*

To 100 gallons of a commercially available blend of straight run, catalytically cracked and polymer blending stocks was added and thoroughly mixed 300 milliliters of tetraethyllead as an antiknock fluid comprising tetraethyllead, 0.5 theory of bromine as ethylene dibromide, and 1.0 theory of chlorine as ethylene dichloride. The resulting homogeneous fuel composition was then utilized as the fuel in the previously designated single cylinder laboratory test engine to formulate a base line of wild ping. It was found that there were 170 wild pings per hour of engine operation.

*Example II*

An improved antiknock fluid composition of the present invention was prepared by adding 0.1 theory of phosphorus as triphenyl phosphine sulfide to 150 milliliters of tetraethyllead as an antiknock fluid comprising tetraethyllead, 0.5 theory of bromine as ethylene dibromide, and 1.0 theory of chlorine as ethylene dichloride. A homogeneous fluid composition was obtained by intimately mixing the aforementioned components. The entire quantity of improved antiknock fluid composition so prepared was added to 50 gallons of a commercially available blend of straight run, catalytically cracked and polymer blending stocks. Upon mechanically agitating the resulting mixture a homogeneous fuel composition was prepared. The laboratory single cylinder test engine as described previously was then operated on this improved fuel composition while contemporaneously determining the rate of wild pings as detected by the wild ping counter. It was found that the utilization of an improved antiknock fuel of the present invention produced from 50 to 63 wild pings per hour as contrasted with a conventional fuel which produced from 135 to 170 wild pings per hour. Consequently, the improved fuel composition of the present invention resulted in a reduction of wild ping amounting to 63 percent.

The foregoing specific examples are merely illustrative of the beneficial effects produced by the improved organolead containing compositions of the present invention. It will be apparent that it is preferred to utilize the adjuvants of this invention such as triethyl phosphine sulfide, dimethylethyl phosphine sulfide, dimethylphenyl phosphine sulfide, trihexyl phosphine sulfide, and the like in high octane quality fuel because of the fact that most of the deposit-induced problems exist on combustion of such fuels.

The superior effectiveness of the preferred embodiments of this invention, namely trihydrocarbon-substituted phosphine sulfides, in the diminution of deposit-induced engine problems is further unexpected when considering the prime constituents phosphorus and sulfur which are contained therein. On the one hand, both sulfur and phosphorus compounds have heretofore been judiciously avoided as much as possible in fuel because of their notorious deleterious effects particularly in the realm of organolead antagonism and the like. In the case of sulfur, for example, refiners have long been resorting to various means of removing sulfur compounds from hydrocarbons of the gasoline boiling range because of their recognized deleterious effects on antiknock activity, engine cleanliness, storage stability, and the like. However, the adjuvants of this invention possessing considerable proportions of phosphorus and sulfur do not bring about such deleterious effects. Furthermore, another surprising effect has been noted, namely the fact that the presence of phosphorus-to-sulfur bonds produced a greater effectiveness regarding wild ping than that exhibited by compounds possessing either phosphorus or sulfur and likewise, a mixture of phosphorus- and sulfur-containing compounds. This fact is evidenced by the findings that the presence of added sulfur in a conventional leaded fuel not only has no beneficial effect on wild ping but actually results in an increase in this phenomenon. By way of example, it was found that the addition of 5 theories of sulfur as a mixture consisting of one theory of di-t-butyl disulfide, 2 theories of dibutyl sulfide and 2 theories of thiophene, a mixture representative of the average sulfur constituents of petroleum hydrocarbon fuel, to a conventional gasoline containing 3 milliliters of tetraethyllead per gallon resulted in a wild ping rate of 98 wild pings per hour. In contrast, the same fuel containing the same concentration of tetraethyllead produced 74 wild pings per hour. Thus, the incorporation of sulfur-containing compounds different from the sulfur-containing adjuvants utilized in this invention resulted in a wild ping rate amounting to 125 percent of the base line. That is to say, the presence of sulfur-containing compounds generally increases the rate of wild ping whereas the presence of a considerable amount of sulfur when suitably bonded in accordance with the present invention results in a definite improvement in this deposit-induced phenomenon. In view of the foregoing, therefore, the apparent conclusion to be reached is that the chemical bonds between the two prime elements making up my adjuvants in some currently unexplainable manner produce enhanced effectiveness with regard to deposit-induced engine phenomena without resulting in secondary deleterious problems normally attributed to the presence of each of the elements when used separately or as mixtures of individual phosphorus- and sulfur-containing compounds.

As indicated, an additional important advantage obtained from practicing this invention is the fact that my adjuvants have little or no antagonistic effect upon the antiknock agent used in the fuel. In line with the enhanced effectiveness of my organolead adjuvants this surprising benefit regarding a minimum of organolead destructiveness is perhaps associated with the degree of oxidative stability inherent in tertiary phosphine sulfides. In other words, it is not inconceivable that my organolead adjuvants are capable of decomposing at the proper instant in the engine cycle so as to exhibit the beneficial effect regarding deposit-induced engine problems while at the same time decomposing at a time during the engine cycle sufficiently far removed from the point at which the organolead compound exerts its beneficial antiknock activity.

Because of their adaptability the adjuvants of the present invention can be successfully utilized with any of the wellknown organolead antiknock agents as indicated hereinbefore. Likewise, insofar as the halide scavengers are concerned, the tri-hydrocarbon-substituted phosphine sulfides used in this invention can be employed in antiknock fluids and fuels containing such materials as ethylene dibromide, ethylene dichloride, mixed dibromotoluenes, trichlorobenzenes and in general such organic halide scavengers as those disclosed in U. S. 1,592,954; 1,668,022; 2,364,921; 2,398,281; 2,479,900; 2,479,901; 2,479,902; 2,479,903; and 2,496,983. Likewise, the adjuvants of this invention can be used in conjunction with other wellknown motor fuel adjuvants such as antioxidants, organolead stabilizers, organic dyes, solubilizers, and indeed with other catalytically active materials frequently employed in fuel.

Having fully described the nature of the present invention, the need therefor, and the best mode devised for carrying it out, it is not intended that this invention be limited except within the spirit and scope of the appended claims.

I claim:

1. An antiknock composition adapted for use as an additive for hydrocarbons of the gasoline boiling range which consists essentially of an organolead antiknock agent and a tri-hydrocarbon-substituted phosphine sulfide containing a total of from 3 to about 30 carbon atoms in the molecule; said phosphine sulfide being present in said composition in amount such that the phosphorus to lead atom ratio is from about 0.1/3 to about 1.6/3.

2. The composition of claim 1 further characterized in that said organolead antiknock agent is a lead alkyl.

3. The composition of claim 1 further characterized in that said organolead antiknock agent is tetraethyllead.

4. An antiknock composition adapted for use as an additive for hydrocarbons of the gasoline boiling range which consists essentially of tetraethyllead, a scavenging amount of halohydrocarbon scavenger capable of reacting with the lead during combustion in a spark ignition internal combustion engine to form volatile lead halide, and a tri-hydrocarbon-substituted phosphine sulfide containing a total of from 3 to about 30 carbon atoms in the molecule; said phosphine sulfide being present in said composition in amount such that the phosphorus to lead atom ratio is from about 0.1/3 to about 1.6/3.

5. The composition of claim 4 further characterized in that said scavenging amount of organic halide material is about 0.5 theory of bromine as a bromohydrocarbon compound capable of reacting with the lead during combustion in a spark ignition internal combustion engine to form volatile lead bromide, and about 1.0 theory of chlorine as a chlorohydrocarbon compound capable of reacting with the lead during combustion in a spark ignition internal combustion engine to form volatile lead chloride.

6. Hydrocarbon fuel of the gasoline boiling range adapted for use as fuel for spark ignition internal combustion engines containing from about 0.53 to about 6.34 grams of lead per gallon as an organolead antiknock agent, and a tri-hydrocarbon-substituted phosphine sulfide containing a total of from 3 to about 30 carbon atoms in the molecule; said phosphine sulfide being present in said fuel in amount such that the phosphorus-to-lead atom ratio is from about 0.1/3 to about 1.6/3.

7. The hydrocarbon fuel composition of claim 6 further characterized in that it contains from about 0.5 to about 4.75 grams of lead per gallon as tetraethyllead, about 0.5 theory of bromine as a bromohydrocarbon compound capable of reacting with the lead during combustion in a spark ignition internal combustion engine to form volatile lead bromide, and about 1.0 theory of chlorine as a chlorohydrocarbon compound capable of reacting with the lead during combustion in a spark ignition internal combustion engine to form volatile lead chloride.

8. Hydrocarbon fuel of the gasoline boiling range adapted for use as fuel for spark ignition internal combustion engines containing from about 0.53 to about 6.34 grams of lead per gallon as an organolead antiknock agent, a scavenging amount of halohydrocarbon scavenger capable of reacting with the lead during combustion in a spark ignition internal combustion engine to form volatile lead halide, and a trihydrocarbon-substituted phosphine sulfide containing a total of from 3 to about 30 carbon atoms in the molecule; said phosphine sulfide being present in said fuel in amount such that the phosphorus-to-lead atom ratio is from about 0.1/3 to about 1.6/3.

9. The hydrocarbon fuel composition of claim 8 further characterized in that said organolead antiknock agent is tetraethyllead.

10. The hydrocarbon fuel composition of claim 8 further characterized in that said phosphine sulfide is triphenylphosphine sulfide.

References Cited in the file of this patent

UNITED STATES PATENTS

| | | |
|---|---|---|
| 2,405,560 | Campbell | Aug. 13, 1946 |
| 2,750,267 | Yust et al. | June 12, 1956 |
| 2,828,195 | Yust et al. | Mar. 25, 1958 |

FOREIGN PATENTS

| | | |
|---|---|---|
| 600,191 | Great Britain | Apr. 2, 1948 |
| 683,405 | Great Britain | Nov. 26, 1952 |